(12) United States Patent
Yagi

(10) Patent No.: US 6,645,654 B2
(45) Date of Patent: Nov. 11, 2003

(54) FUEL CELL SYSTEM

(75) Inventor: Youichi Yagi, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 336 days.

(21) Appl. No.: 09/865,467

(22) Filed: May 29, 2001

(65) Prior Publication Data

US 2001/0055705 A1 Dec. 27, 2001

(30) Foreign Application Priority Data

Jun. 1, 2000 (JP) ........................................ 2000-164641

(51) Int. Cl.[7] ................................................ H01M 8/04
(52) U.S. Cl. .............................. 429/23; 429/22; 429/26
(58) Field of Search .............................. 429/12, 19, 21, 429/22, 23, 26

(56) References Cited

U.S. PATENT DOCUMENTS

| | | | |
|---|---|---|---|
| 5,023,150 A | * | 6/1991 | Takabayashi ................. 429/23 |
| 5,105,142 A | * | 4/1992 | Takabayashi ................. 429/23 |
| 6,384,558 B2 | * | 5/2002 | Yoshida et al. ............. 318/445 |
| 6,489,048 B1 | * | 12/2002 | Ernst et al. .................... 429/22 |

FOREIGN PATENT DOCUMENTS

JP          11-26003       1/1999

* cited by examiner

Primary Examiner—Bruce F. Bell
(74) Attorney, Agent, or Firm—Foley & Lardner

(57) ABSTRACT

Residual hydrogen can be consumed until the output voltage substantially becomes 0 volts and miniaturization and weight saving of the fuel cell system can be achieved without carrying a substance such as an inert gas which does not directly relate to a fuel cell electrical generation.

By cutting fuel supply to a fuel cell 1 at a time of a system halt and connecting the fuel cell output with the discharging resistor 10 of a low ohmic value in a water tank 7, and by switching the connection to a discharging resistor 11 of a high ohmic value in which merely a minute current flows in that state by means of a power switching device 9 when the fuel cell output becomes a fixed value or below, discharging is performed until the output voltage becomes substantially 0 volts without causing damage to the fuel cell to consume residual hydrogen.

6 Claims, 3 Drawing Sheets

FUEL CELL SYSTEM

BACKGROUND OF THE INVENTION

1. Field of the Invention

The present invention relates to a fuel cell system using hydrogen as a fuel, and specifically to a fuel cell system having a characteristic in a residual hydrogen treatment when a system is at a halt.

2. Description of the Related Art

Conventionally, in a fuel cell system for a vehicle in which hydrogen is employed as its fuel, as a treatment technique for residual hydrogen of the time of a system halt, one described in, for example, Japanese Patent Application Laid-Open No. 11-26003 is known. In this conventional fuel cell system, residual hydrogen is consumed first by a discharge resistor during the system halt so as to decrease the voltage of a fuel cell stack, and when the voltage becomes a certain output voltage or below, purge is performed by means of an inert gas such as nitrogen so as to make the output voltage 0 volts.

However, in this conventional fuel cell system's case, since the fuel cell stack is purged by an inert gas for the residual hydrogen treatment, the inert gas has to be carried in the system, and it is not preferable to carry an inert gas which does not directly contribute to a fuel cell electrical generation in terms of weight, cost, layout, refilling, and the like, particularly when it is applied to a system in which a miniaturization and weight saving are necessary such as in a fuel cell system for a vehicle.

SUMMARY OF THE INVENTION

The present invention has been achieved by considering such conventional problems, and it is an object of the present invention to provide a fuel cell system in which residual hydrogen can be consumed until the output voltage becomes 0 volts and miniaturization and weight saving of the system can be achieved without carrying a substance such as an inert gas which does not directly relate to a fuel cell electrical generation.

According to the present invention, the fuel cell stack is connected with a discharging resistor to consume residual hydrogen at the time of a system halt, and the discharging resistor is switched to restrict a discharging current when the output voltage becomes a fixed value or below to consume residual hydrogen until the output voltage becomes 0 volts.

A first aspect of the present invention provides a fuel cell system in which fuel supply to a fuel cell is cut at the time of the system halt and the fuel cell output is connected with a discharging resistor so as to consume residual hydrogen in a fuel cell stack, wherein the system comprises a plurality of discharging resistors and a switching mechanism selecting and connecting a discharging resistor capable of consuming high power at the time of the system halt and selecting and connecting a discharging resistor in which merely a minute current flows when the fuel cell output becomes a fixed value or below.

Thus, since the discharging resistor capable of consuming high power is selected and connected immediately after the system is halted and the discharging resistor in which merely a minute current flows is selected and connected when the fuel cell output becomes a fixed value or below, discharging can be performed until the output voltage becomes 0 volts without causing damage to the fuel cell, and residual hydrogen can be consumed.

According to a second aspect of the present invention, the discharging resistors are provided in a humidification water tank for humidifying hydrogen supplied to the fuel cell.

Accordingly, in addition to the first aspect, since discharging of heat energy by means of the discharging resistors is performed in water inside the water tank, the discharging resistors do not become red-hot by conducting electricity, and a bad influence on fuel hydrogen can be prevented.

According to a third aspect of the present invention, a state where the discharging resistor is connected with the fuel cell output is maintained even after the system is halted. Thus, even when hydrogen is leaked to the fuel cell during the time of the system halt and a small amount of fuel cell electricity is generated, hydrogen can be consumed by the discharging resistor.

DESCRIPTION OF THE PREFERRED EMBODIMENT

Figure 1:
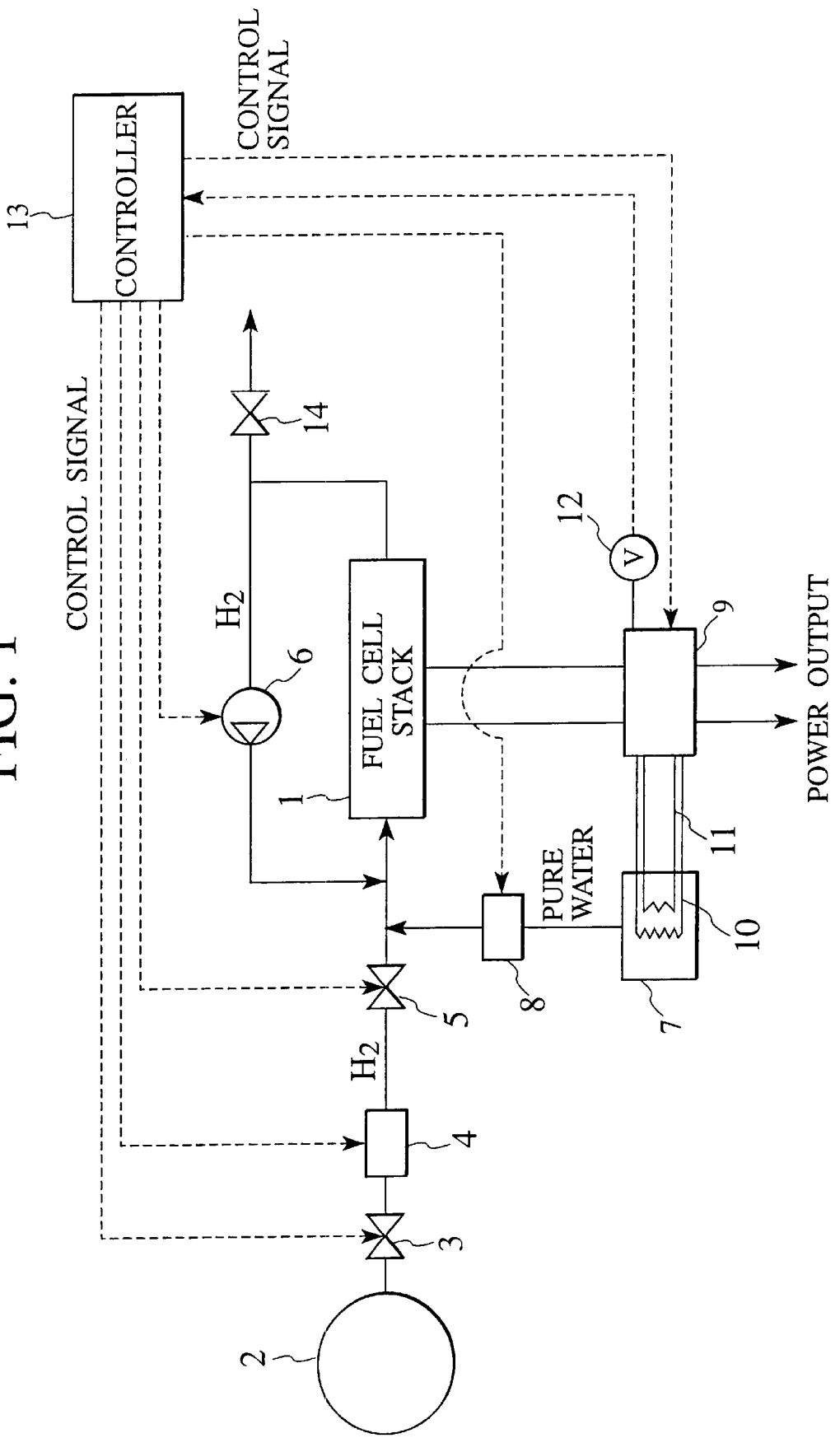
FIG. 1 is a system diagram showing the structure of a first embodiment of the present invention.

Embodiments of the present invention are explained based on drawings. FIG. 1 shows an entire structure of a fuel cell system of an embodiment of the present invention. Hydrogen as a fuel is supplied from a hydrogen tank 2 to a fuel cell stack 1 via a shut off valve (SOV) 3, a regulator 4, and an SOV 5. Although hydrogen which is not consumed in the fuel cell stack 1 may be released to the atmosphere as it is, such hydrogen is usually returned to the inlet of the fuel cell stack 1 by means of a circulating pump 6 in order to enhance the system efficiency. In order to generate electricity in the fuel cell stack 1, air is further supplied as an oxidizing gas by means of a compressor or the like (not shown).

It is necessary for air and hydrogen which are supplied to the fuel cell stack 1 to be fully humidified, and thus water is jetted from a water tank 7 to a hydrogen supply line via a water injection mechanism 8. Pure water is contained in the water tank 7, and water recovered from air of the outlet of the fuel cell stack 1 by means of a condenser (not shown) is utilized as such pure water.

Although the output of the fuel cell stack 1 is usually connected to a load (not shown) via a power switching device 9, the output is switchingly connected to discharging resistors 10, 11 by means of the power switching device 9.

The discharging resistor 10 is composed of a fixed resistor through which high power can be consumed and may be composed of a plurality of resistors connected serially or in parallel. The discharging resistor 11 is composed of a resistor in which a current of only about one ampere (1A) flows at most when the fuel cell stack 1 of the time of switching is at a predetermined voltage $V_0$ and may be composed of a plurality of resistors connected serially or in parallel. These discharging resistors 10, 11 are both set so as to be constantly covered by humidification water in the water tank 7.

The SOVs 3, 5, the regulator 4, the circulating pump 6, the water injection mechanism 8, and the power switching device 9 are controlled by a controller 13. A voltage sensor 12 detects the output voltage of the fuel cell stack 1 and sends a signal to the controller 13. When the SOVs 3, 5 are closed, hydrogen supply to the fuel cell stack 1 is cut off.

Although the water tank 7 is shown in FIG. 1 as if it is employed only for the water therein and for humidifying hydrogen, water is usually commonly employed as a cooling water for the fuel cell stack 1 and as pure water for humidifying the air side.

The SOV 14 on a circulation path blows off (purges) generated water reserved specifically in the fuel cell stack 1 so as to recover the performance of the fuel cell stack, is normally in a closed state, and is opened as occasion demands in accordance with the state of the fuel cell stack 1.

Figure 2:
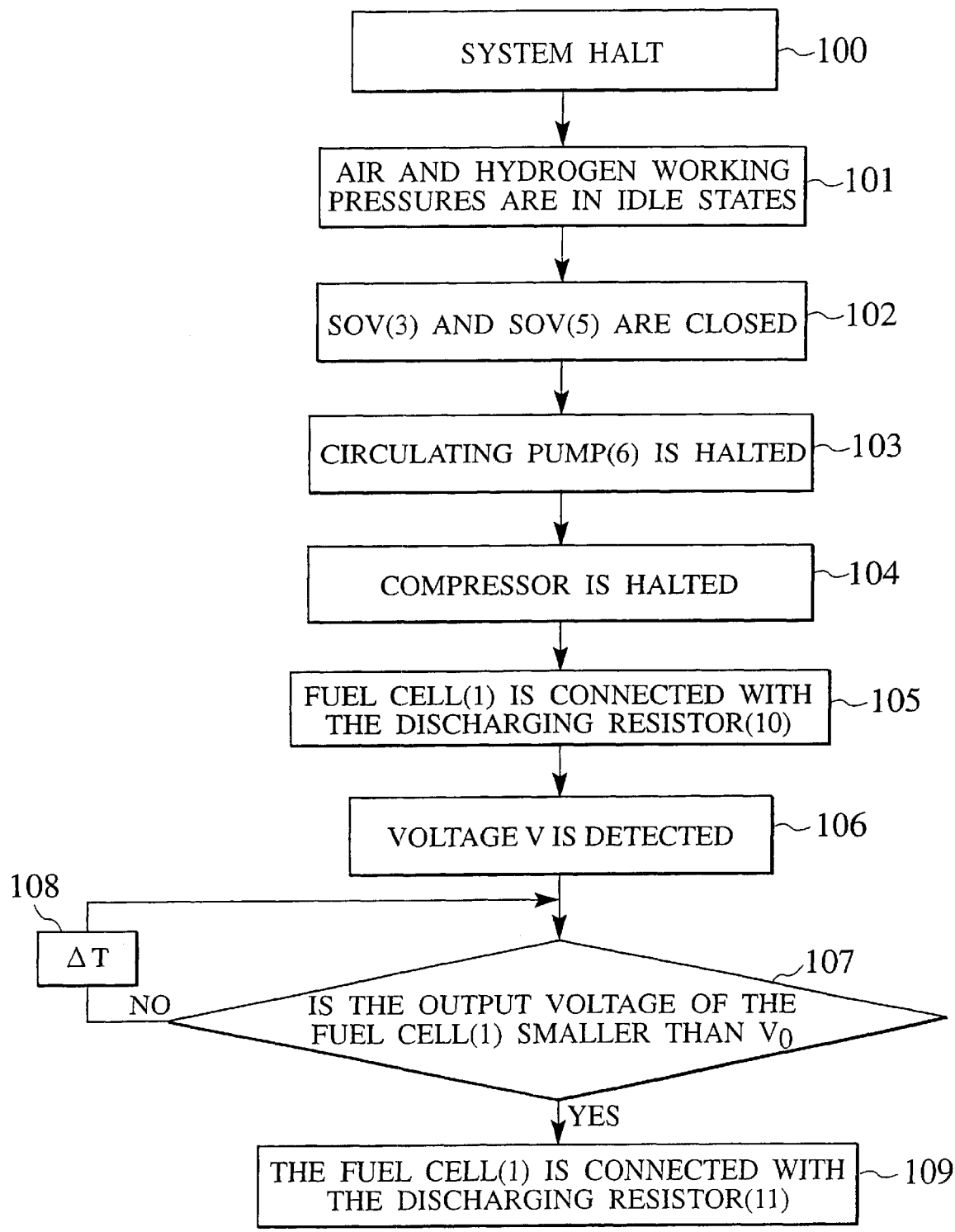
FIG. 2 is a flow chart showing the control of the time of a system halt in the first embodiment.

Next, operations of the fuel cell system with the above structure are explained. FIG. 2 shows a flow chart of the residual hydrogen treatment of the time of a system halt. A system halt treatment is started first at step 100. For example, a key off signal is employed as a halt signal, and the signal is detected in the controller 13 to start the system halt treatment. Then, the working pressures for air and hydrogen in the fuel cell stack 1 are made at lowest levels (idle state) (step 101), the SOV 3, 5 are closed to halt hydrogen supply to the fuel cell stack 1 (step 102), and the circulating pump 6 is halted (step 103).

Since the working pressures for both air and hydrogen in the fuel cell stack 1 are set at lowest levels in the process of step 101, even if the pressure in the air side is decreased earlier, the fuel cell stack 1 does not sustain damage due to the differential pressure with the hydrogen side.

In step 105, the output of the fuel cell stack 1 is switched by the power switching device 9 so as to be connected to the discharging resistor 10. The discharging resistor 10 converts the output power of the fuel cell stack 1 into heat to consume it. Since the output voltage of the fuel cell stack 1 is high in the beginning after the connection, the quantity of heat that the discharging resistor 10 generates is large. However, since the heat is discharged while the water tank 7 is humidified, the discharging resistor 10 does not become red-hot. Thus, even when high power is consumed in the discharging resistor 10, there is no danger that leaked hydrogen catches fire.

When the output of the fuel cell stack 1 is consumed in the discharging resistor 10, the concentration of residual hydrogen which is confined in the hydrogen line around the fuel cell stack 1 closed by the SOV 5 decreases, and the output voltage of the fuel cell stack 1 decreases. When the output voltage value becomes less than a predetermined value $V_0$, if high power is kept being consumed in the discharging resistor 10 of a low ohmic value, a sectional electric countercurrent is generated in the fuel cell stack 1, leaving a damage. This voltage corresponds to about 0.4 volts of a single cell voltage composing the fuel cell stack 1.

The output voltage V of the fuel cell stack 1 is monitored by means of the voltmeter 12 to decide whether the output voltage V is less than the predetermined voltage $V_0$ (step 106, 107). This voltage value $V_0$ is decided, for example, through 0.4V by the number of single cells in the fuel cell stack 1, and it is preferred to add some leeway to this voltage value and set a little bit higher value than this voltage value.

When it is decided that the voltage V is not less than the predetermined value $V_0$ at step 107, time of ΔT is waited (step 108) to return to step 106 and repeat steps 106, 107. The stand-by time ΔT is experimentally decided by finding a good balance with a voltage falling rate of the fuel cell stack 1. The voltage falling rate is decided, depending on the ohmic value of the discharging resistor 10, the volume of the hydrogen line around the fuel cell stack 1 closed by the SOV 5, and the like.

When it is decided that the voltage V is less than the predetermined value $V_0$ at step 107, the discharging resistor is switched from the discharging resistor 10 to a high ohmic value of discharging resistor 11. The discharging resistor 11 is composed of a low ohmic value of resistor in which only a small amount of current by which no damage is given to the fuel cell stack 1 flows when the output voltage of the fuel cell stack 1 becomes $V_0$. An aim of this small current value is approximately 1A, and with this extent of current value, even when discharging is performed until the output voltage V of the fuel cell stack 1 becomes substantially 0 volts, damage does not remain in the fuel cell stack 1. When the output voltage of the fuel cell stack 1 becomes in a state of 0 volts substantially, the concentration of residual hydrogen becomes substantially 0 percent.

The discharging resistor 11 remains connected with the fuel cell stack 1 even after the system halt. This is because of the following reasons. Since the hydrogen tank 2 is under a high pressure, when hydrogen is left as it is for a long period of time, hydrogen leaks around the fuel cell stack 1 due to an internal leak, a fuel cell reaction takes place in the fuel cell stack 1, and an output voltage may be generated, depending on the capabilities of the SOVs 3, 5 or the like. In such case, when the discharging resistor 11 remains connected with the fuel cell stack 1, leaked hydrogen can be consumed, and the output voltage V of the fuel cell stack 1 can be maintained at a state of 0 volts substantially. Since the heat energy that the discharging resistor 11 discharges is added to the humidification water in the water tank 7, there is an effect that pure water is difficult to be frozen in a cold district. When the discharging resistor 11 is composed of a plurality of resistors, the ohmic value can be changed by switching to and employing a predetermined resistor after the system halt.

When the electric power is consumed in the discharging resistors 10, 11, that is, hydrogen is consumed, the pressure around the fuel cell stack decreases. When the pressure becomes a certain level or below, usually, the outside air is sucked so that the pressure around the fuel cell stack does not decrease even when the SOV 14 is closed, and the consumption of hydrogen is not obstructed. However, when the airtightness of the SOV 14 is high such as of a vacuum valve, it is necessary to open the SOV 14 positively on the halfway of hydrogen consumption.

With the fuel cell system of the first embodiment, the discharging resistor 10 of a low ohmic value is connected with the fuel cell stack 1 via the power switching device 9 at the time of the system halt, hydrogen energy is changed to heat energy to be consumed so that the output voltage of the fuel cell stack 1 is decreased, and when the output voltage becomes less than the predetermined value $V_0$ switching to the discharging resistor 11 of a high ohmic value is performed so as to keep discharging at a minute current of approximately 1 A, and the discharging resistors 10, 11 discharge their heat in the humidification water in the water tank 7. Thus, the concentration of residual hydrogen around the fuel cell stack 1 is substantially 0 percent without nitrogen purging at the time of the system halt, and the output voltage can be 0 volts substantially. Even when high power is consumed in the discharging resistor 10 of a low ohmic value, the discharging resistor 10 does not become red-hot, and even if hydrogen leaks, the hydrogen does not catch fire, resulting in safety. By leaving the discharging resistor 11 of a high ohmic value connected with the fuel cell stack 1, a situation can be prevented wherein hydrogen exists around the fuel cell stack 1 due to an internal leak from the hydrogen tank 2 and the SOVs 3, 5 and significant output voltage is generated in the fuel cell stack 1.

Figure 3:
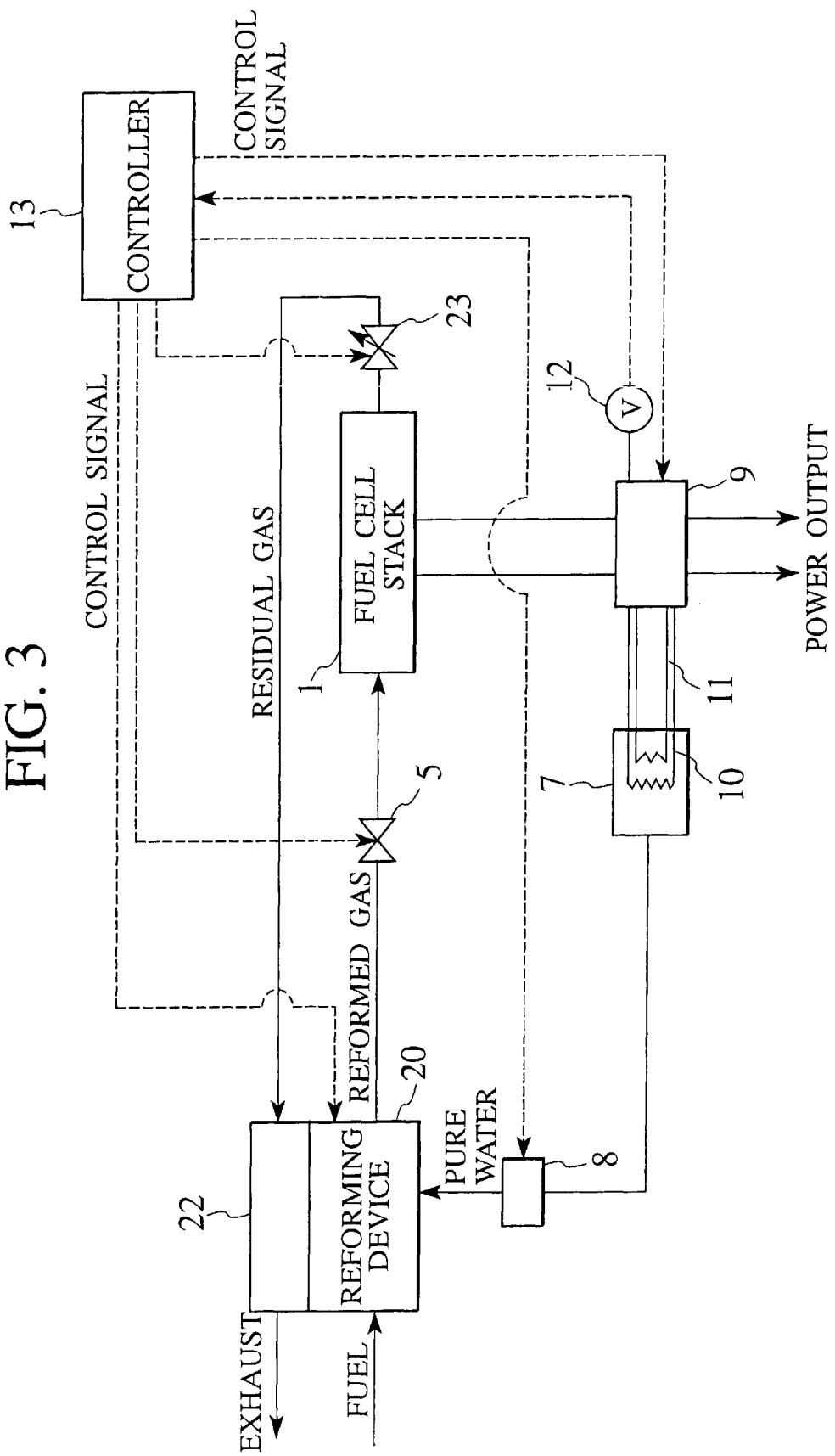
FIG. 3 is a system diagram showing the structure of a second embodiment of the present invention.

Next, a fuel cell system of the second embodiment of the present invention is explained based on FIG. 3. A characteristic of the second embodiment is that a reformer 20 is adopted as a hydrogen supply means instead of the hydrogen tank 2 in the first embodiment shown in FIG. 1. The reformer 20 makes methanol, gasoline, or other hydrocarbons as a basic material and fuel reacted through a vapor reforming reaction so as to generate a hydrogen rich reforming gas. In a case of a fuel cell system for an automobile, the mainstream is employing methanol as fuel, and usually a reforming method in which water is employed is adopted. Common components to the fist embodiment shown in FIG. 1 are explained employing the same reference numerals below.

The reforming gas reformed in the reforming device 20 is supplied to the fuel cell stack 1 via the SOV 5, and only hydrogen gas component is consumed in the electrical generation. Hydrogen gas which has not been consumed is supplied as a residual gas to a burner 22 via a flow control valve (FCV) 23 along with an inert gas such as nitrogen gas. Although it is not shown, air (oxygen) which has not been consumed in the fuel cell stack 1 is also supplied to the burner 22 as an oxidizing gas. In the burner 22, burning is executed in residual air and residual reforming gas, and these gases are discharged to the outside of the system as an exhaust gas.

The shut off valve (SOV) 5 is for shutting off reforming gas supply to the fuel cell stack 1. The FCV 23 is originally for flow control and is employed for pressure control of reforming gas here.

Pure water supplied to the reforming device 20 is supplied from the water tank 7 via the water injection mechanism 8. The controller 13 controls the reforming device 20, the SOV 5, the FCV 23, the water injection mechanism 8, and the power switching device 9 and also controls the reforming device 20.

Although the water tank 7 is shown as if it is employed only for pure water supply to the reforming device 20 in FIG. 3, in practice, it is jointly employed for accommodating pure water for humidifying cooling water of the fuel cell stack 1 and the air supplied to the fuel cell stack 1.

Next, operations of the fuel cell system of the second embodiment are explained. They are basically similar to those of the first embodiment shown in FIG. 1 and FIG. 2. Differences are that only the SOV 5 is closed at the time of the system halt and that the reforming device 20 and a means for shutting off the fuel supply to the reforming device 20 are provided instead of the circulating pump 6 shown in FIG. 1. Although the FCV 23 may be closed at the time of the system halt, since a particular problem does not occur, the FCV 23 is not particularly controlled in the present embodiment.

After the reforming device 20 is halted, the compressor is stopped, and the flow after the compressor stop is the same as that after step 105 of the first embodiment shown in FIG. 2.

With the fuel cell system of the second embodiment, similar to the first embodiment, the concentration of residual hydrogen around the fuel cell stack 1 is made to 0 percent substantially, and the output voltage can be made to 0 volts substantially, without nitrogen purging at the time of a system halt. Even when high power is consumed in the discharging resistor 10 of a low ohmic value, the discharging resistor 10 does not become red-hot, and humidified hydrogen does not catch fire, resulting in safety. By leaving the discharging resistor 11 of a high ohmic value connected with the fuel cell stack 1, a situation can be prevented wherein hydrogen exists around the fuel cell stack 1 due to an internal leak and the output voltage is generated in the fuel cell stack 1.

This application claims benefit of priority under 35USC §119 to Japanese Patent Applications No. 2000-164641, filed on June 1, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system in which fuel supply to a fuel cell is cut when the system is halted, comprising a first discharging resistor selectively connected with an output of the fuel cell and capable of consuming a high current, a second discharging resistor selectively connected with the output of the fuel cell and consuming a minute current, and a switching mechanism selectively connecting the first discharging resistor and the second discharging resistor to the output of the fuel cell, wherein the switching mechanism selects and connects the first discharging resistor when the fuel cell system is halted and selects and connects the second discharging resistor when the output of the fuel cell becomes less than a fixed value thereby consume residual hydrogen inside a fuel cell stack.

2. The fuel cell system according to claim 1, wherein the first discharging resistor is composed of one or more discharging resistors and the second discharging resistor is composed of one or more discharging resistors.

3. The fuel cell system according to claim 2, wherein the first discharging resistor and the second discharging resistor are provided in a humidification water tank for humidifying hydrogen supplied to the fuel cell.

4. The fuel cell system according to claim 2, wherein a state where at least one discharging resistor of the second discharging resistor is connected with the fuel cell output is maintained even after the fuel cell system is halted.

5. The fuel cell system according to claim 2, wherein a state where the second discharging resistor is connected with the fuel cell output is maintained even after the fuel cell system is halted.

6. The fuel cell system according to claim 1, wherein a state where the second discharging resistor is connected with the fuel cell output is maintained even after the fuel cell system is halted.

* * * * *